3,796,636
PROCESS FOR PREPARING HIGH ACTIVITY PEPSIN

John B. Gallagher, Darien, and Laverne W. Van Ness, Homewood, Ill., assignors to Wilson Pharmaceutical & Chemical Corporation
No Drawing. Filed July 14, 1972, Ser. No. 271,973
Int. Cl. C07g 7/028
U.S. Cl. 195—66 R — 6 Claims

ABSTRACT OF THE DISCLOSURE

Pepsin is extracted from animal stomach linings by digestion of a mixture having an aqueous solution containing acetic acid. After digestion, the undissolved residue is separated from the digestion solution and the digestion solution cooled to a temperature in the range of 30° F. to 45° F. Ammonium sulfate is added to the cooled digestion solution in quantities of 170 grams per liter-saturation to precipitate a mixture consisting of pepsin and ammonium sulfate. Precipitated solids are dissolved in water and the acidity of the resultant mixture is adjusted to a pH in the range of 4.0 to 4.5. Ammonium sulfate component of the resultant solution are removed by diffusion through a semi-permeable membrane. The pepsin recovered from the ammonium sulfate free-resultant solution can have a proteolytic activity strength as high as 1:45,000 when converted to a dry powder.

---

This invention relates to a process for preparation of a proteolytic enzyme of high activity. More particularly, it relates to an improved method of recovering pepsin from animal stomach linings, in which the pepsin is precipitated in a form substantially free of contaminating organic matter, and when free of contaminating non-organic matter is characterized by a relatively high proteolytic activity.

Briefly, the process o fthe present invention comprises the steps of digesting stomach linings in an aqueous solution containing acid in quantities producing a pH of less than 5, removing the undissolved portion of said stomach linings from the digestion solution, cooling said digestion solution to a temperature below 45° F. and adding thereto ammonium sulfate in quantities producing a saturation at the temperature of the cooled digestion solution, i.e., 0.3 to 1.0 saturation to salt out a precipitate, dissolving said precipitate in de-ionized water maintained at a tempreature in the range of 35° F. to 80° F. and adjusting the acidity of the resultant solution to a pH in the range of 4 to 4.5, removing the ammonium sulfate components of the resultant solution by diffusion through a semi-permeable membrane to produce a residuum aqueous solution consisting essentially of pepsin, and recovering the pepsin from said aqueous solution.

BACKGROUND OF THE INVENTION

In the conventional methods for the recovery of pepsin from the linings of animal stomachs, the pepsin has been extracted with various aqueous acid solutions. After removal of undissolved linings and separation of mucilagenous elements from the digestion solution, pepsin is recovered from the digestion solution by precipitation methods involving steps such as decreasing the dielectric constant by adding organic solvents such as alcohol, and by salting out pepsin by addition of such inorganic salts as sodium sulfate. Such processes are laborious and costly and the yields are low due to the necessity for extensive purification steps required to eliminate organic and inorganic contaminants.

In one type of process involving alcohol precipitation such as is shown in Keil Pat. No. 2,305,714 the actual amount of pepsin obtained averages about 1% to 3% based on the conventional calculated proteolytic value of 1:10,000 and the dry product has a maximum proteolytic strength of 1:25,000.

Another type of process involving sequential precipitation steps using alcohol and soluble zinc salts, results in yields of the order of 5% based upon the conventional calculated proteolytic value of 1:10,000. When purification steps such as solution and reprecipitation steps are carried out to increase the activity, the steps involving a settling period of 15 hours, effecting an increase in activity from 1:15,000 to 1:45,000 results in an approximately 40% reduction in pepsin yield, i.e., reduction from about 5% to about 3%.

SUMMARY OF THE INVENTION

Now it has been discovered that a pepsin product having an activity as high as 1:45,000 and the relatively high yield of approximately 5% based upon the conventional calculated proteolytic value of 1:10,000 can be obtained by a simplified process involving a combination of steps of digesting of stomach linings in acetic acid solution and precipitating under critical ranges of concentration of the specific precipitation agent, ammonium sulfate, of substantially all of the pepsin present in the digestion solution as a solids mixture consisting essentially of the agent and pepsin, whereas salting out with ammonium halides is ineffective as precipitating agent and sodium sulfate precipitates drastically reduced percentages of the pepsin present in the digestion solution, i.e., amounts of the order of ⅓ the pepsin precipitated by ammonium sulfate, and produces solids mixtures containing substantial amounts of organic matter other than pepsin, which solids mixtures exhibit pepsin activity which is only a small fraction, i.e., as little as ⅒ of the pepsin activity of the precipitate obtained in accordance with the instant invention, dissolving the solids mixture in an aqueous medium to form an aqueous solution of the precipitate, and removing the ammonium sulfate precipitating agent from said aqueous solution of the precipitate. The pepsin recovered after removal of ammonium sulfate has a relatively pure, high activity form which does not require additional processing to improve the purity and activity.

More in detail, the process for obtaining pepsin from animal stomach linings comprises the steps of digesting stomach linings of hogs and other animals in an aqueous solution containing acetic acid in quantities to maintain a pH in the range of 1.5 to a maximum of 5 which cannot be exceeded without loss of pepsin activity, removing the solid residue of said linings from the digestion solution, cooling said digestion solution to a temperature in the range between 30° F. and 45° F., adding to said digestion solution ammonium sulfate in quantities producing a saturation of 0.3 to 1.0, to precipitate a mixture consisting essentially of pepsin and ammonium sulfate, isolating the precipitated mixture, dissolving said precipitated mixture in de-ionized water maintained at a temperature in the range of 35° F. to 80° F. and having an acidity in the pH range of 4.0 to a maximum of 4.5 to avoid destruction of pepsin activity, adjusting the acidity of the resultant solution to a pH in the range of 4.0 to 4.5, if dissolving of the precipitate produces a solution outside of the desired pH range, removing the ammonium sulfate component of the resultant solution by diffusion thru a semi-permeable membrane, and recovering pepsin of a high proteolytic activity strength from said substantially ammonium sulfate free-resultant solution.

By saturation is meant dissolving all of the solute which the solvent can absorb under equilibrium conditions at a given temperature. Saturation of digestion solutions with ammonium sulfate in amounts producing a saturation of 0.3 to 1.0 when at temperatures in the range of 30° F. to 45° F. involves dissolving therein approximately 170 grams to 718 grams per liter of solvent.

In the preferred embodiment of the invention, hog stomach lining is mixed with water in a weight ratio of about 1:1 to form a slurry, the slurry is heated to a temperature of about 122° F., glacial acetic acid is added to the heated slurry in amounts producing an acidity in the pH range between about 4.0 and 4.5, after a digestion period of about 16 hours undissolved portions of the stomach linings are separated from the digestion solution, the digestion solution is cooled to a temperature of about 32° F., ammonium sulfate is introduced into the cooled digestion solution in quantities producing a concentration in the preferred range of 0.4 to 0.8 saturation to salt out a solids mixture consisting of pepsin and ammonium sulfate, the solids mixture is separated from the associated solution and is dissolved in de-ionized water maintained at a temperature of about 72° F., to form a solution having a solids mixture concentration of about 50 grams per liter, the acidity of the solids mixture solution is adjusted to a pH of about 4.0, ammonium sulfate is removed from the pH adjusted solids mixture solution by ultrafiltration using a membrane, for example, known by the tradename "Abcor No. 300," which retains in the residuum solution material of molecular weight exceeding 30,000, and the pepsin is recovered from the substantially ammonium sulfate free resultant solution.

With respect to the first step of extracting pepsin from the stomach linings it has been found that acetic acid and control of pH of the solution is important in obtaining the high yield and high activity of the ultimate product. Other acids such as hydrochloric acid and sulfuric acid while effective as pepsin extraction agents produce digestion solutions which require constant pH adjustments to maintain the pH of the digestion mixture within the optimal range.

The acidity of the acetic acid digestion solution generally is maintained in the pH range of 3 to 4.5 and preferably between 4 and 4.2. The quantity of acid solution added to digest about 4,000 pounds of hog stomach linings present in 900 gallons of water is about 18 gallons of glacial acetic acid.

The suspension of whole or ground stomach linings is maintained at a temperature of 100 to 130° F., for a period of about 3 to 24 hours and preferably at a temperature of about 120° F. to 130° F. for a preferred period of 6 to 12 hours.

After separation of the residue of undissolved stomach linings from the digesting solution and cooling the digestion solution to a temperature in the range between about 30° F. and 45° F., the digestion solution is ready for the step of precipitation of pepsin as a component of a pepsin-ammonium sulfate mixture. The precipitation of a mixture which contains minimal organic contaminants, such as mucosa and mucin, requires a minimum concentration of ammonium sulfate of 0.3 saturation and preferably a concentration in the range of 0.5 to 1.0 saturation.

In the final steps of the process the ammonium sulfate is removed from a solution of the pepsin-ammonium sulfate precipitated mixture by diffusion thru semi-permeable membranes. Such diffusion may be accomplished by dialysis which effects transfer of ammonium sulfate from the mixture solution to a water solution and transfers water into the mixture solution. However, the preferred system is ultrafiltration because the applied pressure system dislodges the ammonium sulfate without the dilution which occurs in the dialysis procedure thru introduction of water into the mixture solution.

The lyophilized pepsin product tests from about 1:30,000 to 1:45,000 in proteolytic strength and the yield is about 5% based upon the conventional calculated strength of 1:10,000.

The invention will be further understood from the following example which is given by way of illustration but without any intention that the invention be limited thereto.

EXAMPLE I 1,600 pounds of hog stomach linings were diluted to a total volume of 360 gallons with water. To the mixture was added 7.2 gallons of glacial acetic acid and the entire stirred mixture was heated to 120° F. for 16 hours. The insoluble portion of the mixture was removed by filtration, and the clear filtrate cooled to 32° F. To the cooled, stirred filtrate amounting to approximately 400 gallons was added 1,032 pounds of ammonium sulfate (0.5 saturation). The ammonium sulfate-pepsin precipitate was removed by filtration using filter-aid. The entire precipitate was removed by filtration using filter-aid. The entire precipitate was suspended in water of a total volume of approximately 100 gallons. The solution temperature was adjusted to approximately 60° F. and the pH to 4.2. The fraction of the precipitate which remained insoluble was removed from the solution of dissolved precipitate by basket centrifugation. The resultant clear solution was concentrated in vacuo to 25 gallons with the concentration temperature not exceeding 80° F. The 25 gallons of concentrate were dialyzed against pH 4.0 water for 5 days using Visking dialysis tubing. After dialysis, the product volume was approximately 47 gallons, and was concentrated in vacuo to 12 gallons, with the concentration temperature not exceeding 80° F. The concentrate was frozen and freeze-dried.

7,387 grams of dry pepsin having a potency of 1:43,900 was recovered as a final product.

EXAMPLE II 100 liters of pepsin filtrate resulting from the acetic acid digestion of the equivalent of 105 pounds of fresh hog stomach linings were cooled to 5° C. and were salted out by stirring with 26,710 grams of ammonium sulfate (.45 saturation). The solution and precipitate was stored for 2 days at 38–40° F. and then centrifuged to remove the insoluble pepsin-ammonium sulfate precipitate having a wet volume of 2 liters. The precipitate was dissolved in 50 liters of 70° F. water, having a pH of 4.0. The aqueous solution of the pepsin-ammonium sulfate precipitate was subjected to ultrafiltration using Abcor 300 membranes. The residuum concentrate had a solids content of 3.5% and was concentrated in vacuo at not more than 80° F. to a solids concentration of 25.1%. The concentrate was then freeze-dried.

A sample of the ultrafiltration concentrate prior to vacuum concentration was freeze-dried and assayed with the following results:

Total solids—3.5%
Potency—1:45,000
Yield equivalent—279.6 pounds 1:10,000 from 5,000 pounds of hog stomach linings.

Although we have described preferred embodiments of the present invention, it will be understood that these are not to be regarded as limitations on the scope of the invention except insofar as included in the accompanying claims.

We claim:

1. A process for obtaining pepsin from animal stomach linings which comprises the steps of digesting stomach linings in an aqueous solution containing acid in quantities producing a pH of less than 5, removing the undissolved portion of said stomach linings from the digestion solution, cooling said digestion solution to a temperature below 45° F., and adding thereto ammonium sulfate in quantities producing a .3 to 1.0 saturation to salt out a precipitate, dissolving said precipitate in water, adjusting the acidity of the solution of precipitate to a pH in the range of 4 to 4.5, removing the ammonium sulfate components of the solution of precipitate to produce a resultant solution consisting essentially of pepsin by diffusion through a semi-permeable membrane, and recovering the pepsin from said resultant solution in dry powder form.

2. The process according to claim 1 wherein the digestion solution is maintained at a pH in the range of 1 to 5, and the cooling of the digestion solution is to a temperature in the range of 30° F. to 45° F.

3. The process according to claim 1 wherein the solution of the precipitate separated from the digestion solution after adjustment of acidity to a pH in the range of 4.0 to 4.5 has the ammonium sulfate removed therefrom by ultrafiltration and recovery of pepsin from the substantially ammonium sulfate-free resultant solution is by a lyophilization step.

4. The process according to claim 1 wherein the weight ratio of stomach lining to water in the slurry subject to the digestion step is about 1:1, the quantity of acetic acid produces a pH in the range of 4.0 to 4.5, the temperature during digestion is maintained between 100° F. and 130° F., and the concentration of ammonium sulfate during precipitation of a pepsin-ammonium sulfate mixture is between 0.4 and 0.8 saturation.

5. The process according to claim 1, wherein said diffusion is thru a semi-permeable membrane which retains in the residuum solution material of molecular weight exceeding 30,000.

6. The process according to claim 1, wherein digesting of stomach linings is in an aqueous solution containing acetic acid in quantities producing a pH in the range between about 1.5 and 5.

References Cited
UNITED STATES PATENTS
2,701,228  2/1955  McKerns _____ 195—66 R LIONEL M. SHAPIRO, Primary Examiner

UNITED STATES PATENT OFFICE
CERTIFICATE OF CORRECTION

Patent No. 3,796,636        Dated March 12, 1974

Inventor(s) John B. Gallagher and Laverne W. Van Ness

It is certified that error appears in the above-identified patent and that said Letters Patent are hereby corrected as shown below:

Column 4, lines 14 and 15, delete "removed by filtration using filter-aid. The entire precipitate was"

Signed and sealed this 23rd day of July 1974.

(SEAL)
Attest:

McCOY M. GIBSON, JR.
Attesting Officer

C. MARSHALL DANN
Commissioner of Patents